United States Patent [19]
Antonini et al.

[11] Patent Number: 5,436,993
[45] Date of Patent: Jul. 25, 1995

[54] MULTIPLE CONNECTOR FOR MULTI-FIBRE OPTIC RIBBONS

[75] Inventors: Franco Antonini; Attilio Casella; Angelo Conversano; Marco Decao, all of Milan; Antonio Menzaghi, Varese; Enrico Serafini, Milan, all of Italy

[73] Assignee: Sirti S.p.A., Milan, Italy

[21] Appl. No.: 184,879

[22] Filed: Jan. 18, 1994

[30] Foreign Application Priority Data

Jan. 21, 1993 [IT] Italy ................. MI93A088

[51] Int. Cl.⁶ .................. G02B 6/00; G02B 6/36
[52] U.S. Cl. ......................................... 385/59
[58] Field of Search ............. 385/59, 88, 89, 90, 385/91, 92

[56] References Cited

U.S. PATENT DOCUMENTS

| | | | |
|---|---|---|---|
| 4,291,943 | 9/1981 | Binek et al. | 385/59 X |
| 4,385,801 | 5/1983 | Bubanko | 385/59 |
| 4,645,295 | 2/1987 | Pronovost | 385/89 X |
| 4,712,864 | 12/1987 | Ellis et al. | 385/59 |
| 4,789,218 | 12/1988 | Paul et al. | 385/59 X |
| 5,018,822 | 5/1991 | Freismuth et al. | 385/59 |
| 5,133,032 | 7/1992 | Salter et al. | 385/59 |
| 5,199,093 | 3/1993 | Longhurst | 385/89 X |
| 5,259,050 | 11/1993 | Yamakawa et al. | 385/114 X |
| 5,295,214 | 3/1994 | Card et al. | 385/88 X |
| 5,325,454 | 6/1994 | Rittle et al. | 385/89 X |
| 5,333,225 | 7/1994 | Jacobowitz et al. | 385/88 X |

FOREIGN PATENT DOCUMENTS

0228063 7/1987 European Pat. Off. .
0118804 9/1994 European Pat. Off. .

Primary Examiner—Akm E. Ullah
Attorney, Agent, or Firm—Hedman, Gibson & Costigan

[57] ABSTRACT

A multiple connector for multi-fibre optic ribbons, comprising two facing plugs snap-insertable into a coupling consisting of a plurality of bushes locked together by a locking device, each of the plugs comprising a butting chamber and a plurality of ferrules complete with a support socket and a helical spring. The butting chamber, containing a plurality of individual optical fibres, also has a snap-cover and is fixed to a protection shell through which a multi-fibre ribbon is inserted.

10 Claims, 2 Drawing Sheets

MULTIPLE CONNECTOR FOR MULTI-FIBRE OPTIC RIBBONS

BACKGROUND OF THE INVENTION

This invention relates to a multiple connector for multi-fibre optic ribbons.

Various types of multiple connectors are currently in use, usually in the form of two facing plugs enabling multi-fibre optic ribbons to be connected together. A ribbon containing at least two optical fibres is inserted into each of them. A fitting projection is provided at the end distant from that through which the ribbon is inserted, at the same end there also being provided two centering or guide elements. Said centering elements are in the form of a pin element and a hole, each located on one side of the fitting projection, to be inserted into the hole or to receive the pin element of the other connector respectively.

To connect the multi-fibre ribbon to another multi-fibre ribbon the two plugs are positioned facing each other. More specifically, two fitting projections internally containing individual fibres of the multi-fibre ribbon are coupled together. To achieve good connection, said individual fibres of both plugs must be aligned, this being possible because of the centering elements.

In addition to centering the two fitting projections, the centering elements also lock the pair of plugs. In this respect, the connection is achieved by respectively inserting the two pin elements into the two holes of each of said facing plugs. Although the described locking element, i.e. a pair of pin elements and holes on each plug, allows easy connection it has the drawback of likewise easy disconnection. This can accidentally happen as a result of a simple pull on the cable or multi-fibre ribbon, with consequent loss of transmission. To obviate this drawback a clip is provided embracing the two facing plugs to retain them in position.

A further drawback is the need to align individual fibres. As the fibre core diameter is just a few microns it is very difficult to simultaneously align two or more fibres to ensure a good connection.

An object of the present invention is to provide a multiple connector which achieves multiple connection of optical fibres while using a space less than that currently necessary.

A further object is to achieve a multiple connection by means of several independent connections, made as separate connections.

A further object is to facilitate the mounting of the connector by eliminating bonding by adhesive or ultrasound.

A further object of the invention is to ensure correct operation and good positioning of the movable parts during coupling, uncoupling and operation.

A further object is to provide a valid locking element which prevents any accidental uncoupling of said connectors due to pulling on the cable.

SUMMARY OF THE INVENTION

These objects are attained by a multiple connector for multi-fibre optic ribbons, comprising two facing plugs snap-insertable into a coupling consisting of a plurality of bushes locked together by a locking device, each of said plugs comprising a butting chamber and a plurality of ferrules each complete with a support socket and a helical spring, said butting chamber having a cover and containing a plurality of individual optical fibres.

The structural and operational characteristics and advantages of a multiple connector according to the present invention will be more apparent from the detailed description given hereinafter by way of non-limiting example with reference to the accompanying drawings, in which:

DETAILED DESCRIPTION OF THE INVENTION

Figure 1:
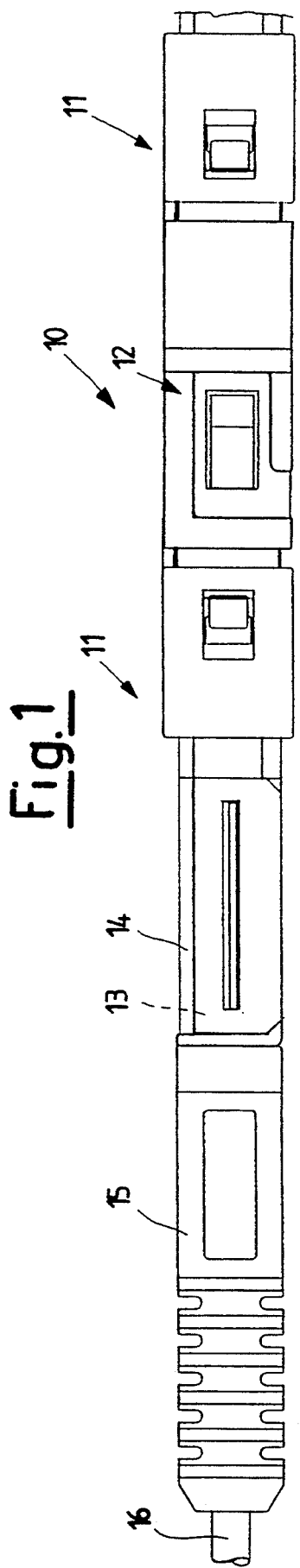
FIGS. 1 and 2 are respectively a side and top view of a multiple connector for optical fibres according to the present invention.
Figure 2:
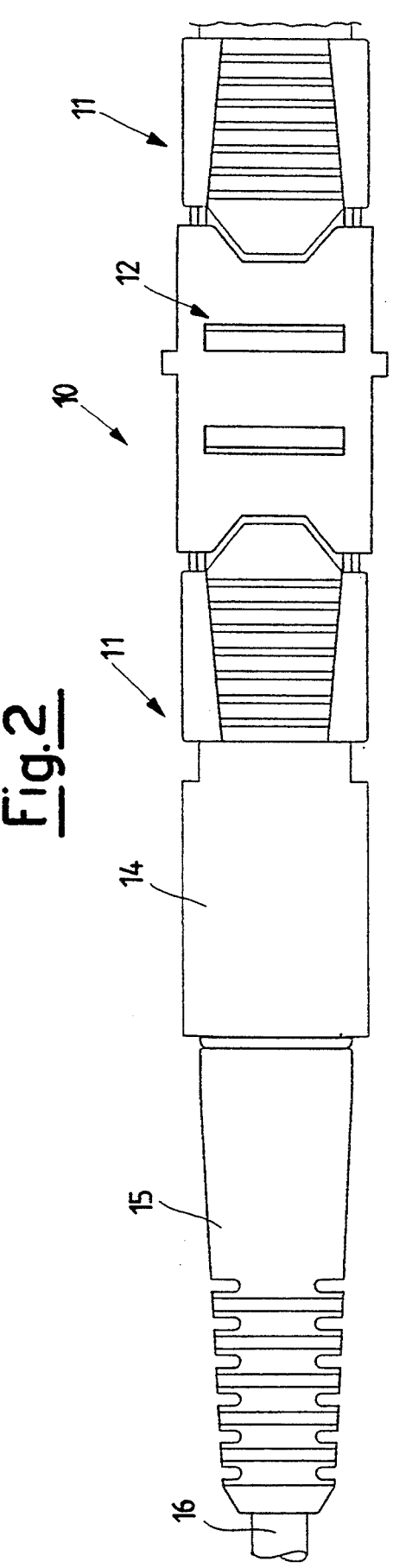

FIGS. 1 and 2 show a multiple connector for multi-fibre optic ribbons according to the present invention, indicated overall by the reference numeral 10.

The connector 10 consists of two facing plugs 11 snap-inserted into a coupling 12. This latter interposed between the plugs 11 acts as a locking element and also as the element which connects them together.

At that end of the plug 11 distant from the end to be inserted into the coupling 12 there is a butting chamber 13 with a snap-cover 14. The chamber 13 is connected to a protection shell 15 of rubber or another similar material, through the interior of which a cable or ribbon 16 also comprising outer protection is inserted. The ribbon 16 is a multi-fibre ribbon containing at least two optical fibres, and in particular four in a preferred embodiment.

Figure 3:
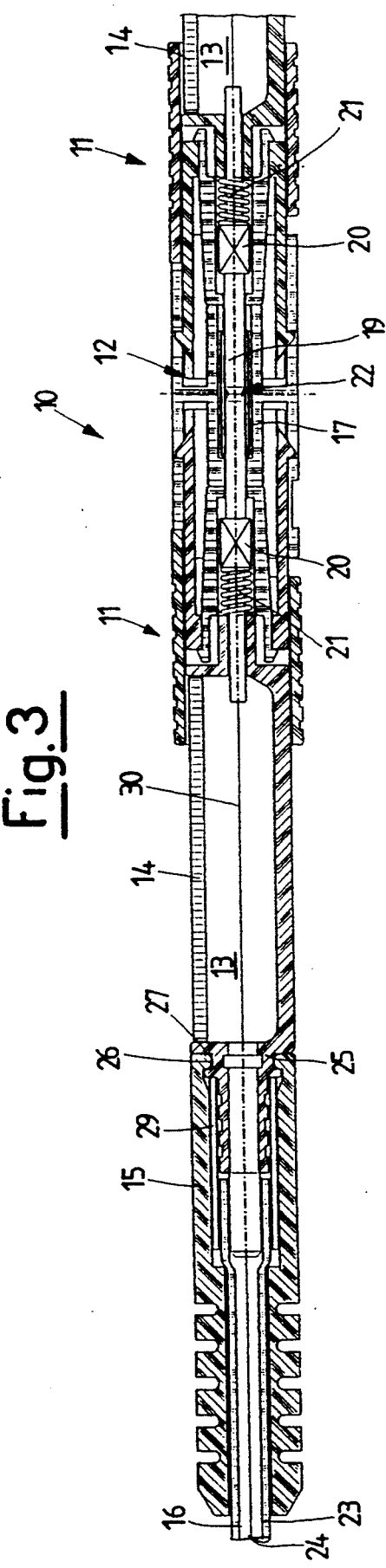
FIG. 3 is a sectional side view of the multiple connector shown in FIGS. 1 and 2.
Figure 4:
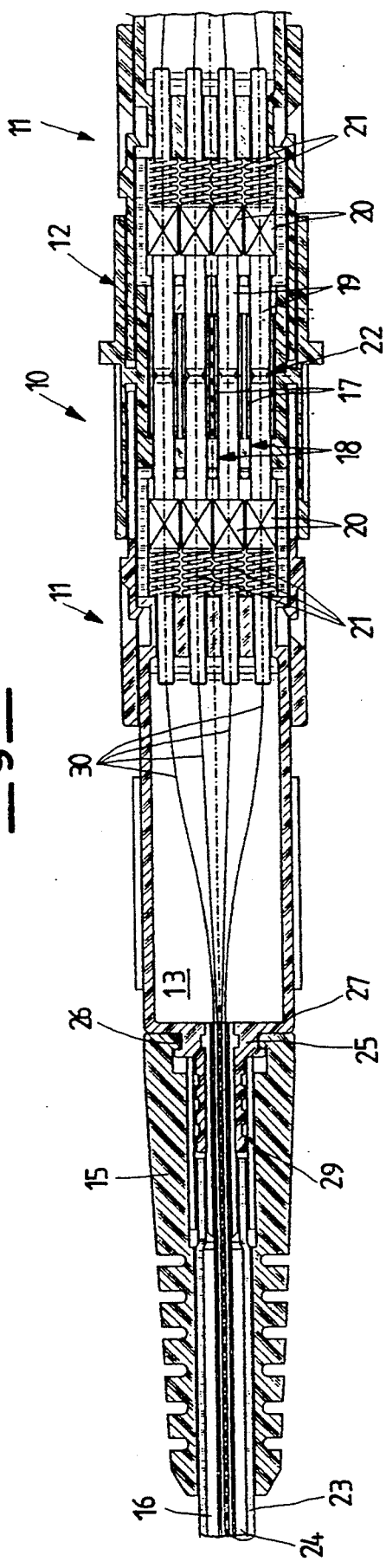
FIG. 4 is a sectional top view of said connector.

FIGS. 3 and 4 show in detail the manner in which the connector 10 is butt-coupled to the ribbon 16.

The plastics components of the connector 10 are formed by moulding, and to facilitate subsequent assembly are provided with elastic projections.

Before commencing the butt-coupling operation, the coupling 12 and plugs 11 are preassembled. Preassembly of the coupling 12 consists of inserting four bushes 17 into the coupling 12, i.e. into its shell. When said bushes 17 have been inserted they are locked by a locking device 18 which is inserted as an interference fit. The locking device 18 is designed and inserted into the shell of the coupling 12 such that the bushes 17 are locked but remain floating.

Preassembly of the plugs 11 consists of inserting four ferrules 19 each complete with a support socket 20 and a helical spring 21 into the body 31 of the plug 11. The springs 21, located behind the support socket 20 in the direction of a contact zone 22, urge the ferrules 19 towards said zone 22 so as to ensure good contact between them, i.e. between two respective ferrules 19 of the two facing plugs 11 when the multiple connector 10 is connected, i.e. in its working position.

The butt-coupling of the ribbon 16 is commenced by preparing the so-called cord head, i.e. that potation of said ribbon 16 to be used for the connection.

To be able to make the connection the outer sheathing 23 of said portion of the ribbon 16 is stripped off. This exposes a layer of kevlar strands 24, the ribbon 16 then being inserted through the protection shell 15 and into the butting chamber 13.

To ensure proper fitting of the butting chamber 13 to the protection shell 15, this latter is mounted on a knurled support 25 on said chamber 13. A recess 26 is provided in an outer surface of the knurled support 25 to act as a seat for a projecting inner edge 27 of the protection shell 15. Having mounted the shell 15 to face the butting chamber 13, the projecting inner edge 27 is inserted into the recess 26. When the bare portion of the ribbon 16 has been properly inserted into the butting chamber 13, a tube 29 previously mounted on the cord is slid to cover the knurled support 25 on the butting chamber 13. Two crimping operations are then carried out, one at the knurled support 25 covered by the kevlar and the other at the outer sheath 23. In this manner the ribbon 16 is securely anchored to the butting chamber 13 and hence to the plug 11.

Having anchored the ribbon 16 it is separated into its four constituent fibres 30, and the primary coating is stripped from them. The fibres 30 prepared in this manner are inserted through the respective four ferrules 19 of the plug 11. A syringe is used to inject the resin for their bonding. Finally said butting chamber 13 is snap-closed by the cover 14.

In the final stage the fibres projecting from the ferrules are cut and then polished by automatic lappers. A series of optical and dimensional checks is then carried out to ensure high-quality performance.

The coupling 12 interposed between the two plugs 11 is formed in such a manner as to ensure both good contact between respective fibres 30 of the two facing plugs 11 and permanent coupling between them. Retention between the parts is provided by a push-pull connection which enables the multiple connector to be coupled and uncoupled by applying a simple axial force.

One of the advantages of the multiple connector for multi-fibre optic ribbons is its geometrically planar structure. In this respect the arrangement of the four ferrules is rectilinear and individually retractable to form four independent connections, with the possibility of floating each of them.

A further advantage is a completely open fibre introduction chamber which is inspectionable at any moment.

A further advantage is the plastics construction of the connector parts. In this respect, the moulding process enables the holes within which the ferrules with their respective support sockets and the bushes slide to be made perfectly smooth and free of impressions and mould closure signs. In addition the use of various elastic fitting projections enables bonding by adhesive or ultrasound to be completely eliminated, with the advantage of simpler and more reliable mechanical connections.

An important advantage is the method for fixing the ferrules to the plug body by a moulded plastics device incorporating reopenable snap-fitting. By virtue of this structure the assemblies can if necessary be reopened using a simple tool, so enabling the ferrules or bushes to be recovered.

A further advantage is the coupling release push-pull device formed in such a manner as not to increase the overall size of the connector. In addition such a coupling eliminates accidental release of the plugs resulting from a simple pull on one or both ribbons.

A further important advantage is the small dimensions of the multiple connector according to the present invention compared with conventional connectors.

We claim:

1. A multiple connector for multi-fibre optic ribbons, comprising two facing plugs snap-insertable into a coupling consisting of a plurality of floating bushes locked together by a locking device, each of said plugs comprising a butting chamber and a plurality of ferrules each complete with a support socket and a helical spring, said butting chamber having a cover and containing a plurality of individual optical fibers wherein the number of optical fibres is equal to the number of ferrules.

2. A multiple connector for multi-fibre optic ribbons as claimed in claim 1, characterised in that said butting chamber is connected to a protection shell through which there is inserted a multi-fibre ribbon passing through a knurled support on said butting chamber.

3. A multiple connector for multi-fibre optic ribbons as claimed in claim 1, characterised in that said helical spring is located behind said support socket in the direction of the contact zone between said two plugs.

4. A multiple connector for multi-fibre optic ribbons as claimed in claim 2, characterised in that a recess is provided in the outer surface of said knurled support to act as a seat for a projecting inner edge of said protection shell which is snap-mountable on said knurled support.

5. A multiple connector for multi-fibre optic ribbons as claimed in claim 1, characterised in that said cover of said butting chamber is a snap-cover.

6. A multiple connector for multi-fibre optic ribbons as claimed in claim 2, characterised in that an annular chamber able to receive tubes is defined between said mutually coupled knurled support and protection shell.

7. A method for butt-coupling a multi-fibre ribbon to a multiple connector for multi-fibre optic ribbons characterized by comprising the following steps:
preassembling a coupling and plugs;
inserting bushes;
locking said bushes by a locking device;
inserting ferrules complete with a support socket and a helical spring located behind said support socket;
preparing a cord head;
mounting a tube over the multi-fibre ribbon;
inserting the multi-fibre ribbon via a protection shell into a butting chamber of said plug;
sliding said tube over said knurled support followed by crimping;
fitting together said protection shell and said butting chamber;
separating said multi-fibre ribbon into a plurality of individual fibres;
stripping the primary coating from said individual fibres;
inserting said individual fibres through the respective plug ferrules;
bonding said individual fibres to said ferrules;
closing said butting chamber by a snap-cover.

8. A method as claimed in claim 7, characterised in that said preparation of the cord head is effected by the following steps:
removing an outer sleeving from a portion of said ribbon to expose a layer of kevlar strands;
inserting said ribbon through a protection shell and into a butting chamber.

9. A method as claimed in claim 7, characterised in that bonding is effected by a resin injected by a syringe.

10. A method as claimed in claim 7, characterised in that said connector is constructed of plastics material by moulding.

* * * * *